(12) United States Patent
Sakata et al.

(10) Patent No.: US 8,840,843 B2
(45) Date of Patent: Sep. 23, 2014

(54) AIR POLLUTION CONTROL APPARATUS AND AIR POLLUTION CONTROL SYSTEM

(75) Inventors: Nobuyasu Sakata, Nagasaki (JP); Rikuma Shijo, Nagasaki (JP); Toshihiro Sato, Nagasaki (JP); Moritoshi Murakami, Hiroshima (JP); Nobuyuki Ukai, Hiroshima (JP); Katsumi Nochi, Hiroshima (JP); Masashi Kiyosawa, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 787 days.

(21) Appl. No.: 13/058,736

(22) PCT Filed: Aug. 4, 2009

(86) PCT No.: PCT/JP2009/063817
§ 371 (c)(1),
(2), (4) Date: Feb. 11, 2011

(87) PCT Pub. No.: WO2010/018769
PCT Pub. Date: Feb. 18, 2010

(65) Prior Publication Data
US 2011/0135541 A1 Jun. 9, 2011

(30) Foreign Application Priority Data
Aug. 12, 2008 (JP) ................. 2008-208213

(51) Int. Cl.
*B01D 53/56* (2006.01)
*B01D 53/90* (2006.01)
*B01D 53/64* (2006.01)
*B01D 53/50* (2006.01)
*B01D 53/86* (2006.01)

(52) U.S. Cl.
CPC ............ *B01D 53/64* (2013.01); *F23J 2215/60* (2013.01); *B01D 2255/20738* (2013.01); *B01D 2255/20753* (2013.01); *B01D 53/501* (2013.01); *B01D 53/56* (2013.01); *B01D 2255/20746* (2013.01); *B01D 2257/404* (2013.01); *B01D 2255/20723* (2013.01); *B01D 2257/602* (2013.01); *B01D 2257/302* (2013.01); *B01D 2255/102* (2013.01); *B01D 53/8631* (2013.01); *B01D 2251/2062* (2013.01); *B01D 2255/20776* (2013.01); *B01D 2255/20769* (2013.01); *B01D 2251/108* (2013.01)
USPC ............................................ 422/176; 422/172

(58) Field of Classification Search
USPC ............... 422/168, 172, 176, 220; 366/388; 239/403, 406
See application file for complete search history.

(56) References Cited

U.S. PATENT DOCUMENTS

| | | | |
|---|---|---|---|
| 5,636,795 A | 6/1997 | Sedgwick | |
| 5,988,115 A * | 11/1999 | Anderson et al. | 122/4 D |
| 6,638,485 B1 | 10/2003 | Iida et al. | |
| 6,913,737 B2 | 7/2005 | Honjo et al. | |

FOREIGN PATENT DOCUMENTS

| | | | |
|---|---|---|---|
| EP | 0142377 A2 | | 5/1985 |
| EP | 0 321 379 | * | 6/1989 |
| EP | 1894616 | * | 3/2008 |
| EP | 1932579 A1 | | 6/2008 |
| JP | 51-23051 U | | 8/1974 |
| JP | 58-137425 U | | 9/1983 |
| JP | 6-29646 U | | 4/1994 |
| JP | 7-9428 U | | 2/1995 |
| JP | 9-173785 A | | 7/1997 |
| JP | 10-230137 A | | 9/1998 |
| JP | 2001-198434 A | | 7/2001 |
| JP | 2006-326498 A | | 12/2006 |
| JP | 2008-049306 A | | 3/2008 |
| WO | 03/008072 A1 | | 1/2003 |
| WO | WO 2008/000616 | * | 1/2008 |

OTHER PUBLICATIONS

Notice of Allowance dated Sep. 24, 2012, issued in corresponding Canadian Patent Application No. 2,733,777 (1 pages).
International Search Report of PCT/JP2009/063817, date of mailing Sep. 29, 2009.
Written Opinion of The International Searching Authority issued in International Application No. PCT/JP2009/063817.

Supplementary European Search Report dated Jan. 2, 2012, issued in corresponding European Patent Application No. 09806662.4.Supp.
Communication under Rule 71(3) EPC dated Jan. 3, 2014, issued in corresponding European application No. 09806662.4 (29 pages).
Japanese Decision of a Patent Grant dated Jan. 28, 2014, issued in corresponding Japanese application No. 2008-208213, w/ English translation (5 pages).

* cited by examiner

*Primary Examiner* — Jill Warden
*Assistant Examiner* — Joye L Woodard
(74) *Attorney, Agent, or Firm* — Westerman, Hattori, Daniels & Adrian, LLP

(57) ABSTRACT

An air pollution control apparatus includes at least one denitration catalyst layer for reducing the amounts of nitrogen oxides in flue gas from a boiler and oxidizing mercury with hydrogen chloride sprayed into the flue gas. Spraying pipe headers 51 are disposed in a flue gas duct 19. The spraying pipe headers 51 are inserted into the flue gas duct 19 and arranged in a direction orthogonal to the direction of a gas flow in the flue gas duct 19. At least four spray nozzles 52-1 to 52-4 are disposed at intervals on the spraying pipe header 51 to form a vertical vortex flow 53 in the gas flow direction. A swirling diffuser plate is disposed on an opening side of the spray nozzles to form the vertical vortex flow in the gas flow direction, wherein the swirling diffuser plate has a flat shape at one side parallel to the spraying pipe header and a wavy shape corresponding to the nozzle intervals on the header at the other side. The diffusion of hydrogen chloride is thereby facilitated in a rapid manner. Therefore, the number of the nozzles can be reduced, and the uniformity of the concentration of hydrogen chloride at the location of the catalyst can be ensured even when the spacing between the nozzles is increased.

3 Claims, 8 Drawing Sheets

AIR POLLUTION CONTROL APPARATUS AND AIR POLLUTION CONTROL SYSTEM

FIELD

The present invention relates to an air pollution control apparatus for treating flue gas discharged from a combustion apparatus and to an air pollution control system.

BACKGROUND

Flue gas discharged from coal combustion boilers used as combustion apparatuses in, for example, thermal power plants and other facilities contains highly toxic mercury. Therefore, various systems for reducing the amount of mercury in the flue gas have conventionally been studied.

Generally, a coal combustion boiler includes a wet desulfurization unit for reducing the amount of the sulfur content in flue gas. In an air pollution control facility including a boiler provided with such a desulfurization unit used as an air pollution control apparatus, it is well known that the ratio of water-soluble divalent metallic mercury (Hg) increases as the content of chlorine (Cl) in the flue gas increases. In this case, the mercury is easily collected by the desulfurization unit.

Therefore, in recent years, various proposals have been made on methods and apparatuses for treating metallic mercury using a combination of a denitration catalyst layer for reducing NOx and a wet desulfurization unit that uses an alkali absorbent as a sulfur oxide (SOx) absorbent.

Known examples of the method of treating metallic mercury in flue gas include a method that uses an absorbent such as activated carbon or a selenium filter to reduce the amount of the metallic mercury. However, this method requires special absorption-reduction unit and therefore is not suitable for treatment of a large volume of flue gas such as flue gas treatment in power plants.

In one proposed method of treating metallic mercury in a large volume of flue gas (see, for example, Patent Literatures 1 and 2), a chlorinating agent is gas-atomized into a flue gas duct in a process upstream of a high-temperature denitration catalyst layer to oxidize (chlorinate) the mercury on the denitration catalyst. Then the water-soluble chlorinated mercury formed is absorbed in a downstream wet desulfurization unit. The apparatus and technique for gas-atomization into a flue gas duct have been in practical use, for example, spraying of $NH_3$ onto a denitration catalyst layer or gas-atomization of a chlorinating agent.

FIG. 5 is a schematic diagram of an air pollution control system for a coal combustion boiler. As shown in FIG. 5, the conventional air pollution control system 100 includes: a denitration catalyst layer 13 for reducing the amounts of nitrogen oxides (NOx) in flue gas 12 from a coal combustion boiler 11 to which coal is supplied as fuel F and for oxidizing mercury (Hg) with hydrochloric acid (HCl) sprayed into the flue gas 12; an air preheater 14 for recovering heat of the flue gas 12 in which nitrogen oxides (NOx) have been reduced in amounts; an electric precipitator 15 for reducing the amount of soot particles in the flue gas 12 from which the heat has been recovered; a desulfurization unit 16 for reducing the amounts of sulfur oxides (SOx) and mercury (Hg) in the flue gas 12 in which the soot particles have been reduced in amount; and a stack 18 for discharging the desulfurized flue gas 12 as cleaned-up gas 17.

A flue gas duct 19 on the upstream of the denitration catalyst layer 13 has an injection section for hydrochloric acid (HCl), and hydrochloric acid (liquid) stored in a hydrochloric acid (liquid HCl) supply unit 20 is vaporized in a hydrogen chloride spraying unit 21 and then sprayed into the flue gas 12 as hydrogen chloride through hydrogen chloride (HCl) spray nozzles 21a.

The flue gas duct 19 on the upstream of the denitration catalyst layer 13 also has an injection section for ammonia ($NH_3$), and ammonia supplied from an $NH_3$ supply unit 29 is sprayed into the flue gas 12 through ammonia spray nozzles 29a to reduce nitrogen oxides (NOx).

In FIG. 5, reference sign 25 represents an oxidation-reduction potential measuring-controlling unit (OPR controller), and 26 represents air.

The flue gas 12 from the coal combustion boiler 11 is supplied to the denitration catalyst layer 13. Then, air 27 is heated in the air preheater 14 by heat exchange, and the resultant flue gas 12 is supplied to the electric precipitator 15 and then to the desulfurization unit 16 and discharged to the air as the cleaned-up gas 17.

In addition, to reduce the influences of, for example, corrosion damage to the apparatus caused by the chlorinating agent to thereby improve reliability, the concentration of mercury in the flue gas after wet desulfurization is measured by a mercury monitor to adjust the supply amount of the chlorinating agent on the basis of the mercury concentration after desulfurization (see, for example, Patent Literature 2).

As described above, in the conventional system, hydrogen chloride and ammonia are supplied to the flue gas 12 to reduce the amounts of NOx (nitrogen oxides) in the flue gas 12 and to oxidize mercury (Hg) in the flue gas 12.

More specifically, $NH_3$ is used for reduction-denitration of NOx. $NH_3$ supplied from the $NH_3$ supply unit 29 is sprayed into the flue gas 12 through the ammonia ($NH_3$) spray nozzles 29a to denitrate the flue gas 12 by converting NOx into nitrogen ($N_2$) in the denitration catalyst layer 13 through the reduction reactions represented by the following formulas:

$$4NO+4NH_3+O_2 \rightarrow 4N_2+6H_2O; \text{ and} \quad (1)$$

$$NO+NO_2+2NH_3 \rightarrow 2N_2+3H_2O. \quad (2)$$

Hydrogen chloride is used to oxidize mercury. Hydrogen chloride used as the chlorinating agent is supplied from the liquid HCl supply unit 20 to the hydrogen chloride (HCl) spray unit 21, and the hydrochloric acid vaporized therein is sprayed into the flue gas 12 as hydrogen chloride (HCl) through the hydrogen chloride spray nozzles 21a. Low-solubility Hg is oxidized (chlorinated) on the denitration catalyst in the denitration catalyst layer 13 according to the following formula to convert Hg into mercury chloride ($HgCl_2$) having high water solubility. Then Hg contained in the flue gas 12 is reduced in amount in the desulfurization unit 16 disposed downstream of the denitration catalyst layer 13.

$$Hg+2HCl+\tfrac{1}{2}O_2 \rightarrow HgCl_2+H_2O \quad (3)$$

When coal or heavy oil is used as fuel, the fuel contains Cl, and therefore the combustion gas contains Cl. However, the Cl content varies depending on the type of the fuel, and it is difficult to control the concentration of Cl in the flue gas 12. Therefore, preferably, HCl or the like is added upstream of the denitration catalyst layer 13 in an amount more than necessary to reduce the amount of Hg in a reliable manner.

In the denitration catalyst layer 13 used, the denitration catalyst is supported on a honeycomb-shaped substrate having rectangular passages arranged in a lattice pattern, and the cross-sections of the passages have a polygonal shape such as a triangular or rectangular shape.

CITATION LIST

Patent Literature

Patent Literature 1: Unexamined Japanese Patent Application No. H10-230137
Patent Literature 2: Unexamined Japanese Patent Application No. 2001-198434

SUMMARY

Technical Problem

In the flow of the flue gas 12 supplied to the conventional denitration catalyst layer 13, the inlet flow conditions in the flue gas duct can fluctuate (the flow can fluctuate). In consideration of the fluctuations, a large number of feed nozzles must be provided to make the concentration of hydrogen chloride uniform. This results in a problem in that initial cost and maintenance cost increase enormously.

Therefore, there is a strong demand for efficient spraying of hydrogen chloride into the flue gas duct and a reduction in the number of nozzles installed.

In view of the above problem, it is an object of the present invention to provide an air pollution control apparatus and an air pollution control system that allow hydrogen chloride to efficiently diffuse into the flow of flue gas to be supplied to a denitration catalyst layer.

Solution to Problem

According to an aspect of the present invention, an air pollution control apparatus including at least one denitration catalyst layer for reducing an amount of a nitrogen oxide in flue gas from a boiler and oxidizing mercury with hydrogen chloride sprayed into the flue gas, the air pollution control apparatus includes a gas diffusion facilitating unit. The hydrogen chloride is supplied to a flue gas duct while a swirling gas flow is generated using the gas diffusion facilitating unit.

Advantageously, in the air pollution control apparatus, the gas diffusion facilitating unit is disposed in the flue gas duct, and the gas diffusion facilitating unit includes: a spraying pipe header inserted into the flue gas duct and disposed in a direction orthogonal to a gas flow direction in the flue gas duct; and at least three spray nozzles that are disposed on the spraying pipe header to form a vertical vortex flow in the gas flow direction.

Advantageously, in the air pollution control apparatus, the gas diffusion facilitating unit is disposed in the flue gas duct, and the gas diffusion facilitating unit includes: a spraying pipe header inserted into the flue gas duct and disposed in a direction orthogonal to a gas flow direction in the flue gas duct; and a plurality of opposed spray nozzles that are disposed on the spraying pipe header to form a vertical vortex flow in the gas flow direction.

Advantageously, in the air pollution control apparatus, the gas diffusion facilitating unit is disposed in the flue gas duct, and the gas diffusion facilitating unit includes: a spraying pipe header inserted into the flue gas duct and disposed in a direction orthogonal to a gas flow direction in the flue gas duct; a spray nozzle disposed on the spraying pipe header; and a swirling diffuser plate that is disposed on an opening side of the spray nozzle to form a vertical vortex flow in the gas flow direction.

Advantageously, in the air pollution control apparatus, the gas diffusion facilitating unit is disposed in the flue gas duct, and the gas diffusion facilitating unit includes: a spraying pipe header inserted into the flue gas duct and disposed in a direction orthogonal to a gas flow direction in the flue gas duct; a spray nozzle disposed on the spraying pipe header; and a swirling vane that is disposed on an opening side of the spray nozzle to form a vertical vortex flow in the gas flow direction.

According to another aspect of the present invention, an air pollution control system includes: the boiler; a chlorinating agent supply unit for injecting a chlorinating agent to flue gas discharged to a flue gas duct disposed downstream of the boiler; the air pollution control apparatus above described; a desulfurization unit for reducing an amount of a sulfur oxide in the flue gas subjected to denitration; and a stack for discharging the flue gas subjected to desulfurization.

Advantageously, in the air pollution control apparatus further includes an ammonia supply unit for feeding ammonia to the flue gas discharged to the flue gas duct disposed downstream of the boiler.

Advantageous Effects of Invention

In the present invention, hydrogen chloride is supplied to the flue gas duct while a swirling gas flow is generated using the gas diffusion facilitating unit, and this facilitates the diffusion of hydrogen chloride in a rapid manner. Therefore, the number of the nozzles can be reduced, and the concentration uniformity at the location of the catalyst can be ensured even when the spacing between the nozzles is increased.

DESCRIPTION OF EMBODIMENTS

Hereinafter, the present invention will be described in detail with reference to the drawings. However, the present invention is not limited to embodiments described below. The components in the following embodiments include those readily apparent to persons skilled in the art and those substantially similar thereto.

[Embodiment 1]

An air pollution control system to which an air pollution control apparatus according to an embodiment of the present invention is applied will be described with reference to the drawings.

Figure 5:
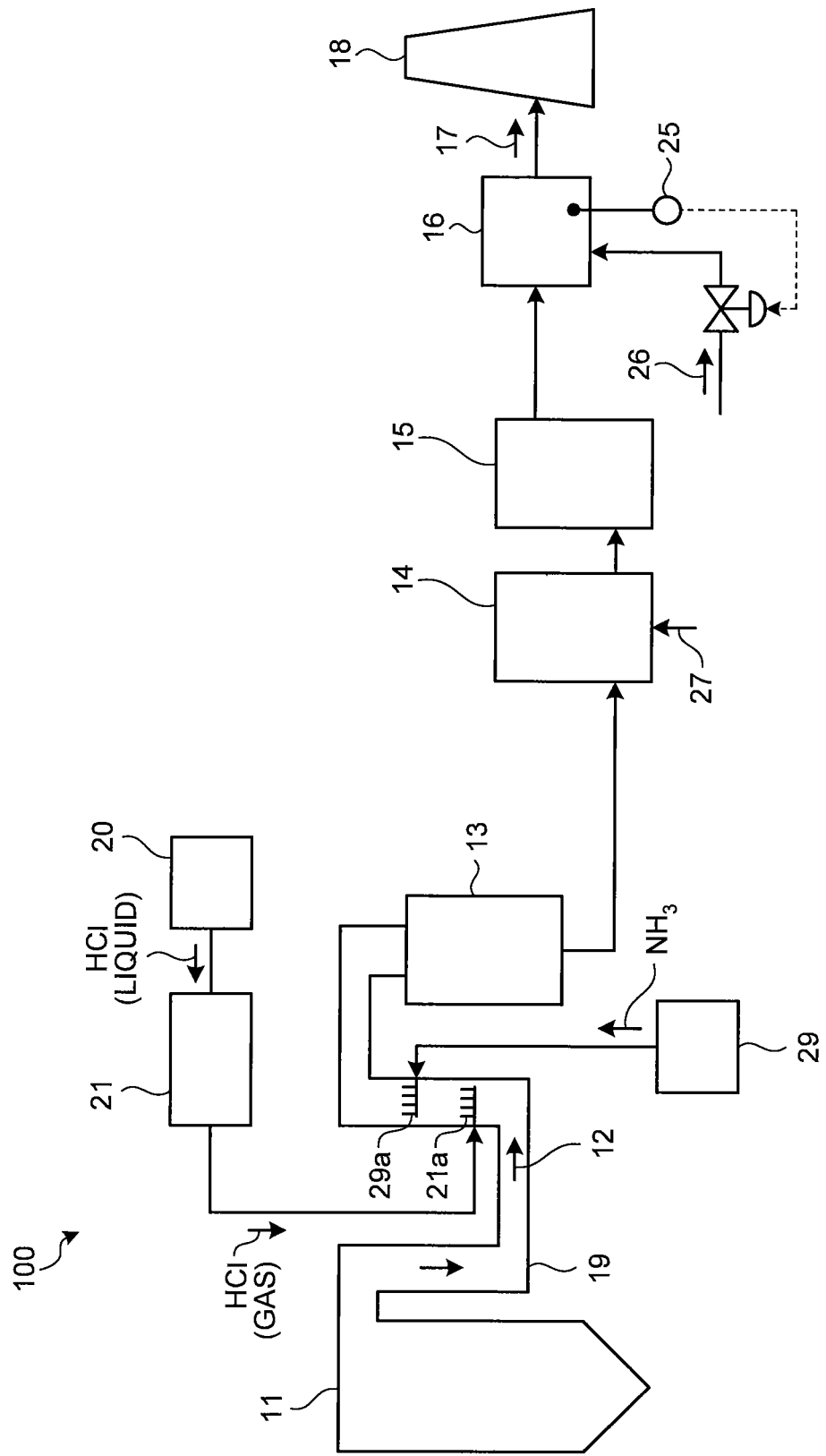
FIG. 5 is a schematic diagram of an air pollution control system for a coal combustion boiler.

The configuration of the air pollution control system to which the air pollution control apparatus according to the present embodiment is applied is the same as the configuration of the air pollution control system shown in FIG. 5. Therefore, in the present embodiment, only the configuration of the air pollution control apparatus will be described.

Figure 1A:
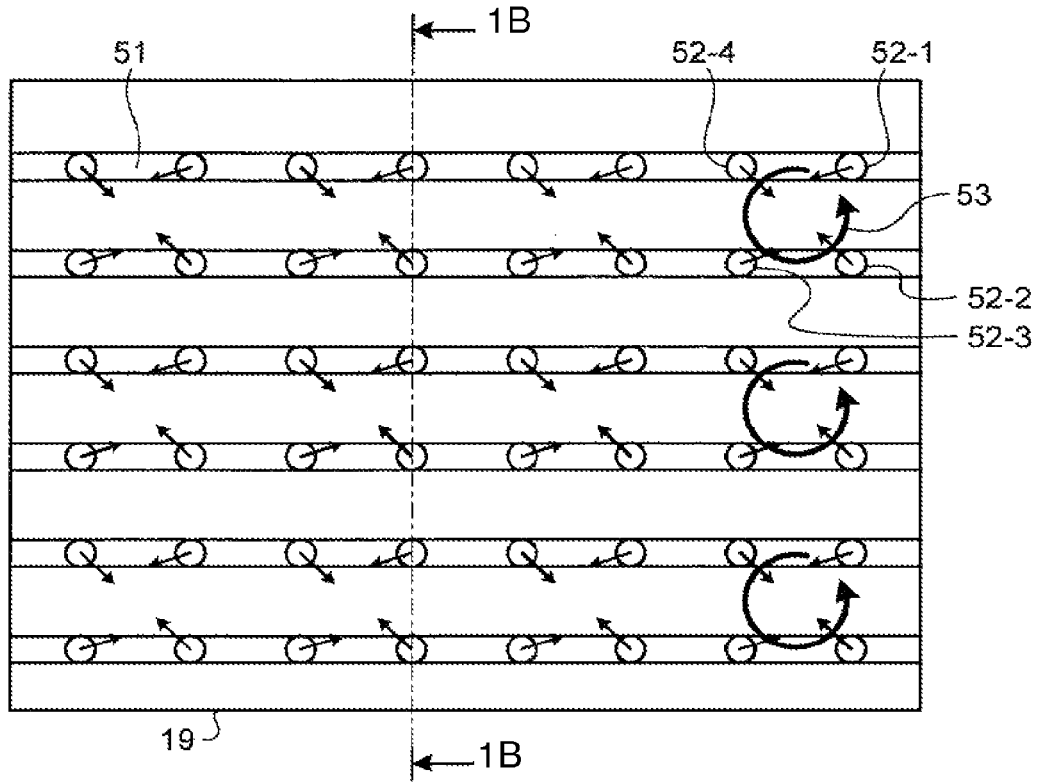
FIG. 1A is a schematic diagram illustrating spray nozzles in a flue gas duct in an air pollution control apparatus in Embodiment 1.
Figure 1B:
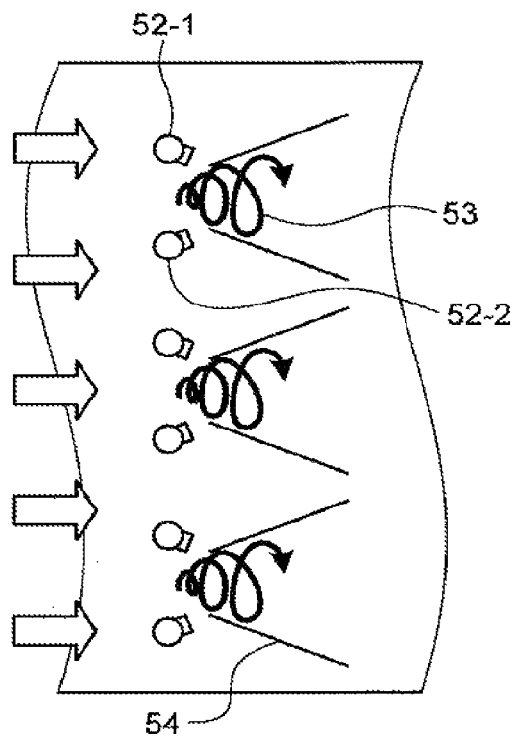
FIG. 1B is a diagram viewed along arrows 1B-1B in FIG. 1A.

FIG. 1A is a schematic diagram illustrating spray nozzles in a flue gas duct in the air pollution control apparatus according to the embodiment. FIG. 1B is a diagram viewed along arrows 1B-1B in FIG. 1A. Since the configuration of the air pollution control system is the same as that shown in FIG. 5, the description of the air pollution control system is omitted.

As shown in FIGS. 1A and 1B, the air pollution control apparatus according to the present embodiment includes at least one denitration catalyst layer for reducing the amounts of nitrogen oxides in flue gas 12 from a boiler 11 and oxidizing mercury with hydrogen chloride sprayed into the flue gas 12. The hydrogen chloride is supplied to the flue gas duct while a swirling gas flow is generated using gas diffusion facilitating unit.

The gas diffusion facilitating unit in the present embodiment is shown in FIG. 1A. The air pollution control apparatus in the present embodiment that includes the gas diffusion facilitating unit includes at least one denitration catalyst layer for reducing the amounts of nitrogen oxides in the flue gas 12 from the boiler 11 and oxidizing mercury with hydrogen chloride sprayed into the flue gas 12. The hydrogen chloride is supplied to the flue gas duct while a swirling gas flow is generated using the gas diffusion facilitating unit.

More specifically, in the present embodiment, the angles of the ejection directions of four nozzles are adjusted to predetermined values. Therefore, a swirling flow can be generated by a plurality of spray nozzles 52-1 to 52-4.

According to the present embodiment, the plurality of spray nozzles 52-1 to 52-4 are treated as a single unit, and the momenta of the jets from the spray nozzles 52-1 to 52-4 cause a vertical vortex flow 53 to be formed.

As shown in FIG. 1B, the vertical vortex is a vertical vortex flow 53 having a rotation axis in the gas flow direction of the flue gas 12, and the centrifugal force of the vertical vortex causes the hydrogen chloride to diffuse outward in the radial direction. The vertical vortex collapses in a downstream region, and the diffusion is thereby facilitated in a rapid manner. In FIG. 1B, reference sign 54 represents the diffusion width of the hydrogen chloride.

According to the present embodiment, the diffusion of hydrogen chloride is significantly facilitated. Therefore, the number of the nozzles can be less than that in the conventional apparatus, and the uniformity of the concentration of hydrogen chloride at the location of the catalyst can be ensured even when the spacing between the nozzles is increased.

The spray nozzles 52 disposed in the flue gas duct 19 may be combined in any suitable manner so long as a swirling flow can be generated. The number of combined nozzles may be three or more so that the vertical vortex flow 53 is formed.

[Embodiment 2]

An air pollution control apparatus according to an embodiment of the present invention will be described with reference to the drawings.

Figure 2A:
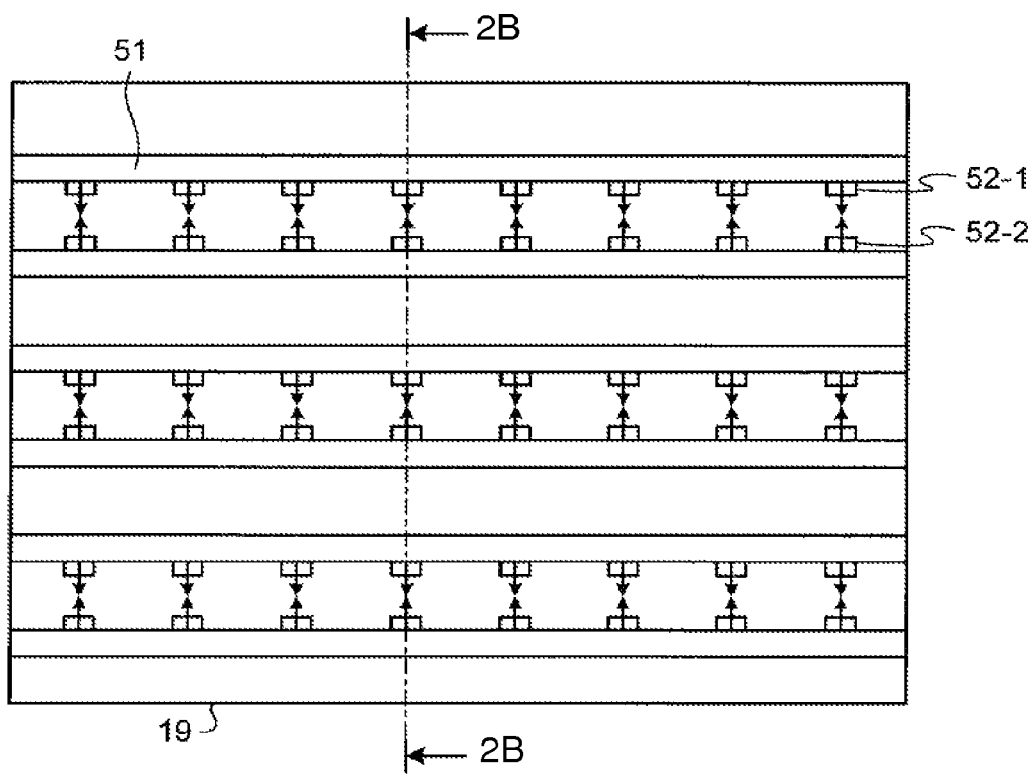
FIG. 2A is a schematic diagram illustrating spray nozzles in a flue gas duct in an air pollution control apparatus in Embodiment 2.
Figure 2B:
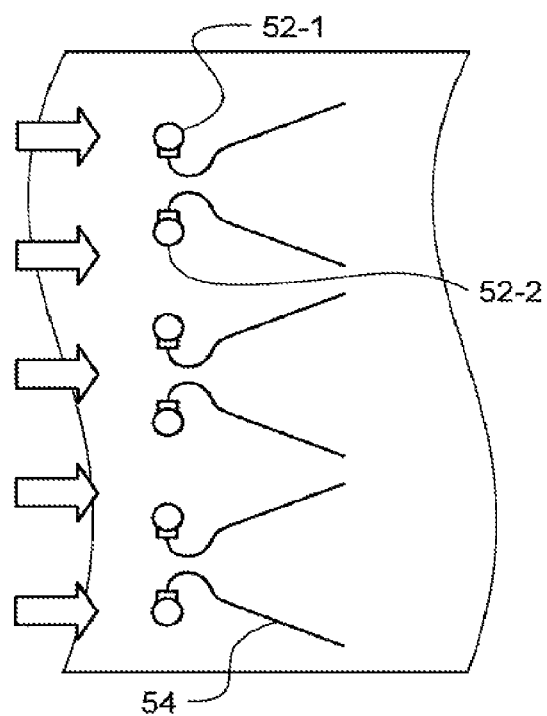
FIG. 2B is a diagram viewed along arrows 2B-2B in FIG. 2A.
Figure 2C:
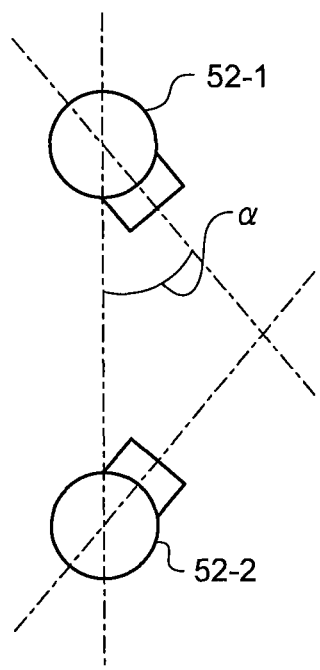
FIG. 2C is a schematic diagram illustrating the arrangement of opposing spray nozzles.

FIG. 2A is a schematic diagram illustrating spray nozzles in the flue gas duct in an air pollution control apparatus according to the embodiment, and FIG. 2B is a diagram viewed along arrows 2B-2B in FIG. 2A. FIG. 2C is a schematic diagram illustrating the arrangement of opposing spray nozzles. Since the configuration of the air pollution control system is the same as that shown in FIG. 5, the description of the air pollution control system is omitted.

In the present embodiment, as shown in FIGS. 2A, 2B, and 2C, the gas diffusion facilitating unit is disposed in the flue gas duct 19 and includes: spraying pipe headers 51 that are inserted into the flue gas duct 19 and disposed in a direction orthogonal to the gas flow direction in the flue gas duct 19; and a plurality of spray nozzles 52 that are disposed on the spraying pipe headers 51 and opposed to each other so that the jets from the spray nozzles 52 collide with each other.

In the present embodiment, spray nozzles 52-1 and 52-2 are opposed to each other as shown in FIG. 2C so that two jets therefrom collide with each other.

The collision of the jets causes the cores of the jets, in which the diffusion of gas is small, to be broken early, and the diffusion is thereby facilitated.

The spray nozzles 52-1 and 52-2 are opposed to each other at an opposing angle $\alpha$. The nozzles may be directly opposed to each other ($\alpha=0$) or may be opposed at a predetermined angle $\alpha$ with respect to the gas flow direction. However, $\alpha=30°$ or more is not preferred because the jets of hydrogen chloride merge.

In the above configuration, the diffusion of hydrogen chloride is facilitated. Therefore, the number of the spray nozzles 52 can be reduced, and the uniformity of the concentration of hydrogen chloride at the location of the catalyst can be ensured even when the spacing between the nozzles is increased.

[Embodiment 3]

An air pollution control apparatus according to an embodiment of the present invention will be described with reference to the drawings.

Figure 3A:
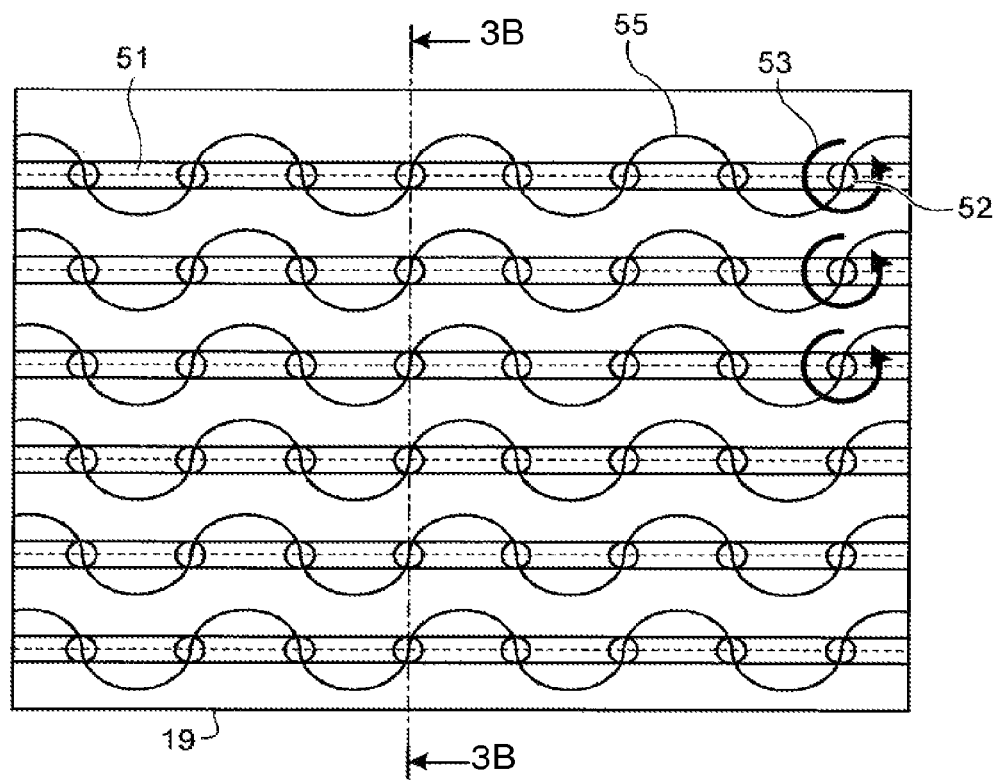
FIG. 3A is a schematic diagram illustrating spray nozzles in a flue gas duct in an air pollution control apparatus in Embodiment 3.
Figure 3B:
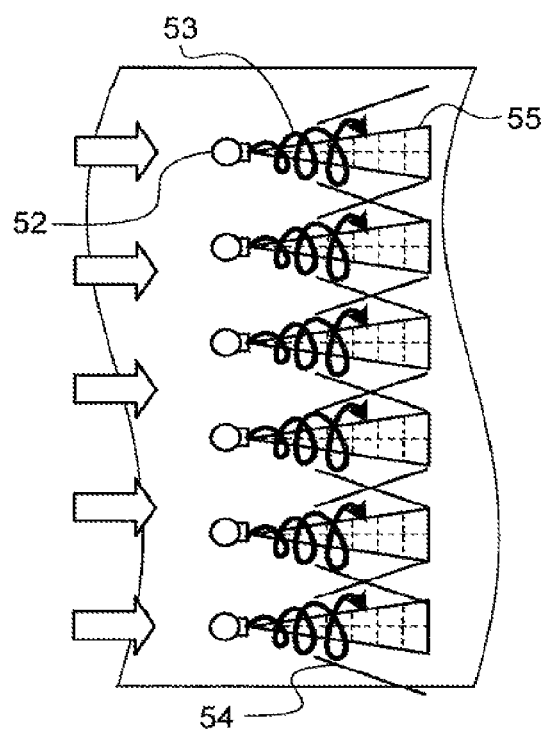
FIG. 3B is a diagram viewed along arrows 3B-3B in FIG. 3A.
Figure 3C:
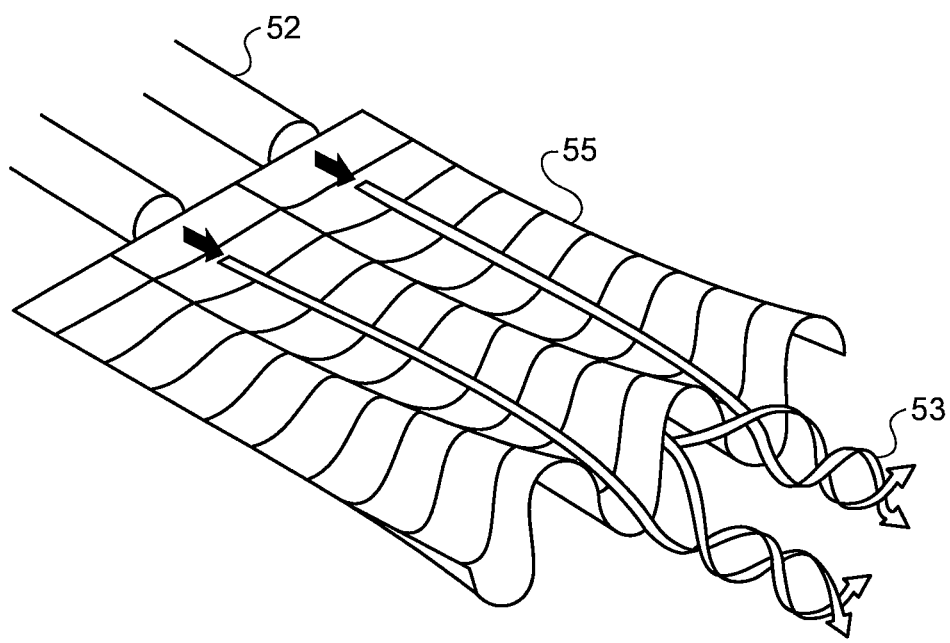
FIG. 3C is a perspective view of a swirling diffuser plate.

FIG. 3A is a schematic diagram illustrating spray nozzles in the flue gas duct in an air pollution control apparatus according to the embodiment. FIG. 3B is a diagram viewed along 3B-3B in FIG. 3A, and FIG. 3C is a perspective view of a swirling diffuser plate. Since the configuration of the air pollution control system is the same as that shown in FIG. 5, the description of the air pollution control system is omitted.

In the present embodiment, as shown in FIGS. 3A to 3C, the gas diffusion facilitating unit is disposed in the flue gas duct 19 and includes: spraying pipe headers 51 that are inserted into the flue gas duct 19 and disposed in a direction orthogonal to the gas flow direction in the flue gas duct 19; spray nozzles 52 that are disposed on the spraying pipe headers 51; and swirling diffuser plates 55 that are disposed on the opening side of the spray nozzles 52 so that vertical vortex flows are formed in the gas flow direction.

In the present embodiment, the swirling diffuser plates 55 having a wavy shape are added on the opening side of the spray nozzles 52 to generate vertical vortexes 53 along the jet axis of hydrogen chloride, as shown in FIG. 3C.

Figure 3D:
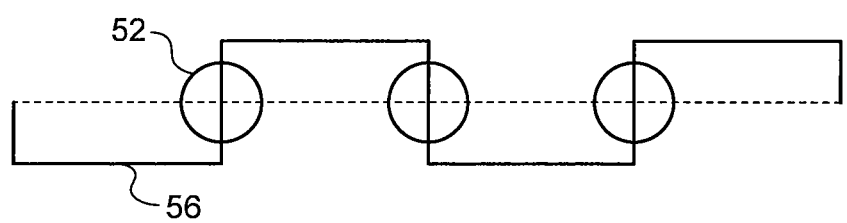
FIG. 3D is a perspective view illustrating the installed state of another swirling diffuser plate.

The shape of the swirling diffuser plates may be different from the wave shape, and swirling diffuser plates 56 formed into a staggered rectangular pattern shown in FIG. 3D may be used.

According to the present embodiment, the jets from the spray nozzles 52 are drawn into the vertical vortexes generated by the swirling diffuser plates 55.

The centrifugal force of the vertical vortexes causes the hydrogen chloride to diffuse outward in the radial direction. The vertical vortexes collapse in a downstream region, and the diffusion is thereby facilitated in a rapid manner.

According to the present embodiment, the diffusion is facilitated. Therefore, the number of the spray nozzles 52 can be reduced, and the uniformity of the concentration at the location of the catalyst can be ensured even when the spacing between the nozzles is increased.

[Embodiment 4]

An air pollution control apparatus according to an embodiment of the present invention will be described with reference to the drawings.

Figure 4A:
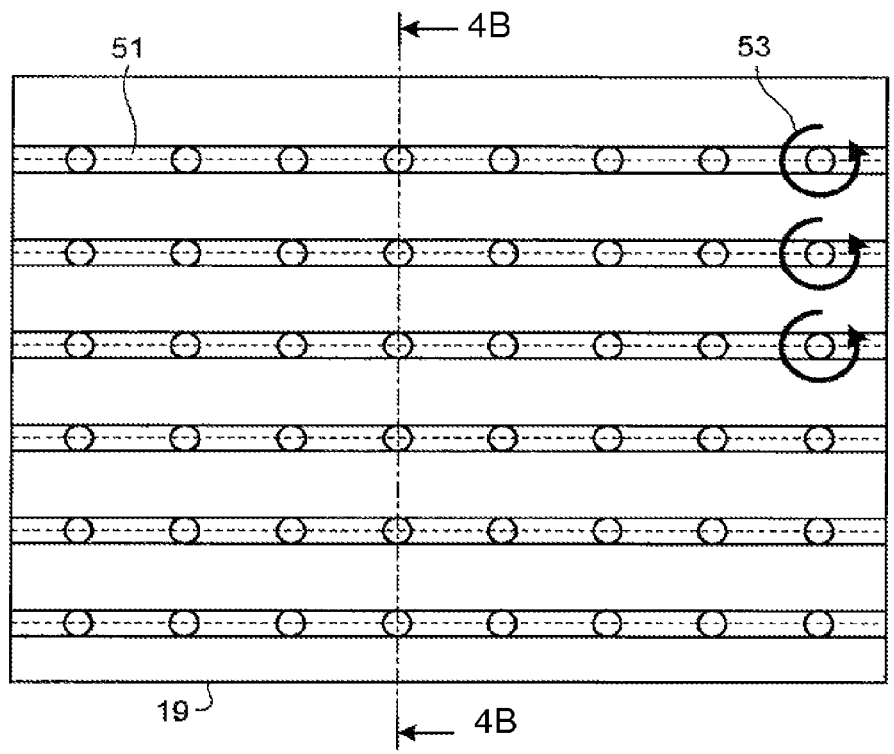
FIG. 4A is a schematic diagram illustrating spray nozzles in a flue gas duct in an air pollution control apparatus in Embodiment 4.
Figure 4B:
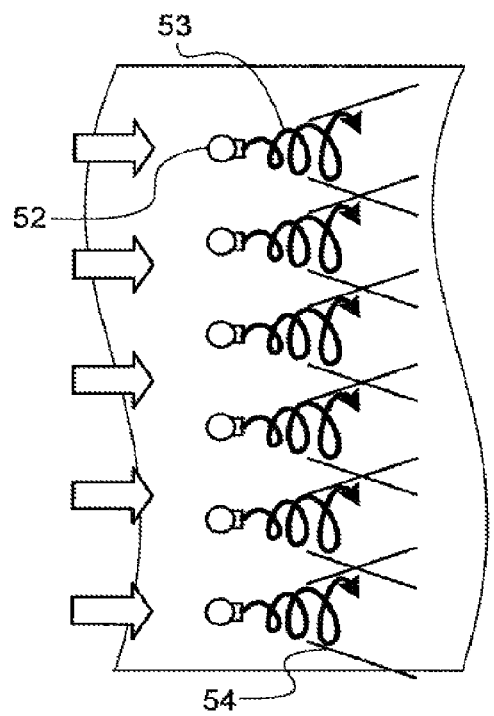
FIG. 4B is a diagram viewed along arrows 4B-4B in FIG. 4A.
Figure 4C:
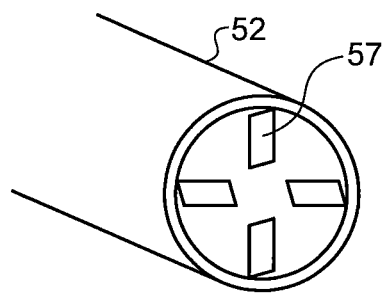
FIG. 4C is a schematic diagram of swirling vanes.
Figure 4D:
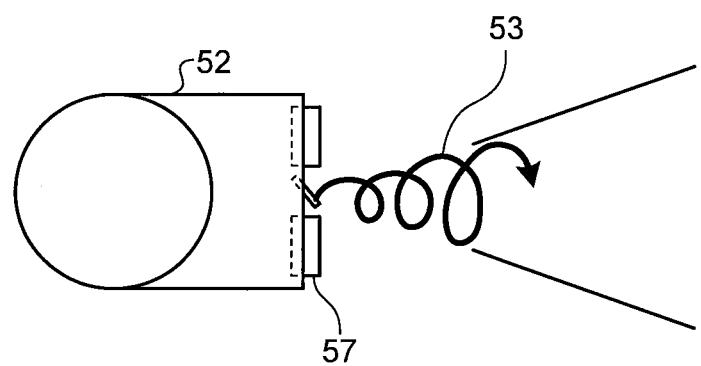
FIG. 4D is a side view of the swirling vanes.

FIG. 4A is a schematic diagram illustrating spray nozzles in the flue gas duct in an air pollution control apparatus according to the embodiment; FIG. 4B is a diagram viewed along arrows 4B-4B in FIG. 4A; FIG. 4C is a perspective view of swirling vanes; and FIG. 4D is a side view of the swirling vanes. Since the configuration of the air pollution control system is the same as that shown in FIG. 5, the description of the air pollution control system is omitted.

In the present embodiment, as shown in FIGS. 4A to 4D, the gas diffusion facilitating unit is disposed in the flue gas duct 19 and includes: spraying pipe headers 51 that are inserted into the flue gas duct 19 and disposed in a direction orthogonal to the gas flow direction in the flue gas duct 19; spray nozzles 52 that are disposed on the spraying pipe headers 51; and swirling vanes 57 that are disposed on the opening side of the spray nozzles 52 so that vertical vortex flows are formed in the gas flow direction.

In the present embodiment, the swirling vanes 57 are disposed in the outlets of the spray nozzles. Therefore, the jets of hydrogen chloride swirl in the flow of the flue gas 12 around the spray nozzles.

According to the present embodiment, the jets from the spray nozzles 52 swirl to generate vertical vortexes, and the centrifugal force of the vertical vortexes causes the hydrogen chloride to diffuse outward in the radial direction.

The vertical vortexes collapse in a downstream region, and the diffusion is thereby facilitated in a rapid manner.

According to the present embodiment, the diffusion is facilitated. Therefore, the number of the spray nozzles 52 can be reduced, and the uniformity of the concentration at the location of the catalyst can be ensured even when the spacing between the nozzles is increased.

In the air pollution control apparatus according to the present embodiments, the denitration catalyst used in the denitration catalyst layer 13 for reduction-denitration may be any catalyst prepared by supporting an oxide or sulfate of a metal such as V, W, Mo, Ni, Co, Fe, Cr, Mn, or Cu, a noble metal such as Pt, Ru, Rh, Pd, or Ir, or a mixture thereof on a support such as titania, silica, zirconia, a complex oxide thereof, or zeolite.

In the present embodiments, no particular limitation is imposed on the concentration of HCl used. For example, concentrated hydrochloric acid and diluted hydrochloric acid having a concentration of about 5% may be used. In the present embodiments, hydrogen chloride (HCl) is used as the chlorinating agent, but the present invention is not limited thereto. Any chlorinating agent may be used so long as it reacts with Hg in the flue gas in the presence of the denitration catalyst to form mercury chloride, HgCl and/or $HgCl_2$. Examples of the chlorinating agent include ammonium chloride, chlorine, hypochlorous acid, ammonium hypochlorite, chlorous acid, ammonium chlorite, chloric acid, ammonium chlorate, perchloric acid, ammonium perchlorate, amine salts of the above acids, and other salts of the above acids.

The amount of the chlorinating agent added to the flue gas 12 may be stoichiometric with the amount of mercury having low solubility in water or more than the stoichiometric amount. In consideration of the efficiency of reducing the amount of Hg in the flue gas 12 and the concentration of chlorine in the water discharged on the downstream side, the chlorinating agent is sprayed into the flue gas 12 in the flue gas duct 19 such that the concentration of the chlorinating agent in the flue gas 12 is 1000 ppm or less.

The position at which HCl is added to the flue gas 12 in the flue gas duct 19 is upstream of the position at which $NH_3$ is added but may be downstream of the position for $NH_3$.

In the present embodiments, both HCl and $NH_3$ are added to the flue gas 12 discharged from the boiler 11. However, $NH_3$ may not be added to the flue gas 12 in the flue gas duct 19. This is because of the following reason. In the denitration catalyst layer 13 in the air pollution control apparatus 10, the amounts of NOx (nitrogen oxides) in the flue gas 12 are reduced, and Hg in the flue gas 12 is oxidized. Then the amount of Hg is reduced by the desulfurization unit (not shown) disposed on the downstream side. Therefore, even when $NH_3$ is not added to the flue gas 12 in the flue gas duct 19, Hg is converted to chlorides by HCl in the presence of the denitration catalyst in the denitration catalyst layer 13, and the ability to reduce the amount of Hg by the desulfurization unit (not shown) is unchanged.

To spray ammonia, the nozzles in any of Embodiments 1 to 4 may be used so that swirling flows are formed.

As described above, the air pollution control apparatus according to the present embodiments includes the denitration catalyst layer 13 for reducing the amounts of NOx (nitrogen oxides) in the flue gas 12 from the boiler 11 and oxidizing Hg with HCl sprayed into the flue gas 12. In this air pollution control apparatus, this hydrogen chloride is supplied to the flue gas duct while a swirling gas flow is generated using the gas diffusion facilitating unit, so that the diffusion of the hydrogen chloride is facilitated in a rapid manner. Therefore, the number of the nozzles can be reduced, and the uniformity of the concentration of hydrogen chloride at the location of the catalyst can be ensured even when the spacing between the nozzles is increased.

In the present embodiments, the flue gas used is discharged from the boiler of a thermal power plant in which fossil fuel, such as coal or heavy oil, containing sulfur, mercury, etc. is combusted, but the invention is not limited thereto. The invention is applicable to flue gas containing carbon dioxide, oxygen, SOx, soot particles, or moisture and having low NOx concentration, boiler flue gas discharged from plants in which fuel containing sulfur, mercury, etc. is combusted, heating furnace flue gas discharged from metal plants, petroleum refining plants, Petrochemistry plants, and other plants, and other types of flue gas.

Industrial Applicability

As described above, in the air pollution control apparatus according to the present invention, hydrogen chloride is supplied to the flue gas duct while a swirling gas flow is generated using the gas diffusion facilitating unit, so that the diffusion of the hydrogen chloride is facilitated in a rapid manner. Therefore, the number of the nozzles can be reduced, and the uniformity of the concentration of hydrogen chloride at the location of the catalyst can be ensured even when the spacing between the nozzles is increased. The air pollution control apparatus is suitable for the treatment of flue gas discharged from an apparatus, such as a thermal power plant, in which fossil fuel, such as coal or heavy oil, containing mercury is combusted.

Reference Signs List

51 SPRAYING PIPE HEADER 52 (52-1 to 52-4) SPRAY NOZZLE

53 VERTICAL VORTEX FLOW

54 DIFFUSION WIDTH OF HYDROGEN CHLORIDE

The invention claimed is:

1. An air pollution control apparatus including at least one denitration catalyst layer for reducing an amount of a nitrogen oxide in flue gas from a boiler and oxidizing mercury with hydrogen chloride sprayed into the flue gas, the air pollution control apparatus comprising:
- a gas diffusion facilitating unit, the hydrogen chloride being supplied to a flue gas duct while a swirling gas flow is generated using the gas diffusion facilitating unit, wherein the gas diffusion facilitating unit is disposed in the flue gas duct, and
- the gas diffusion facilitating unit includes: a spraying pipe header inserted into the flue gas duct and disposed in a direction orthogonal to a gas flow direction in the flue gas duct;
- a plurality of spray nozzles disposed on the spraying pipe header at certain intervals; and
- a swirling diffuser plate that is disposed on an opening side of the spray nozzle to form a vertical vortex flow in the gas flow direction,
- wherein the swirling diffuser plate has a flat shape at one side parallel to the spraying pipe header and a wavy shape corresponding to the certain intervals at the other side.

2. An air pollution control system, comprising:
- a boiler;
- a chlorinating agent supply unit for injecting a chlorinating agent to flue gas discharged to a flue gas duct disposed downstream of the boiler;
- the air pollution control apparatus according to claim 1;
- a desulfurization unit for reducing an amount of a sulfur oxide in the flue gas subjected to denitration; and
- a stack for discharging the flue gas subjected to desulfurization.

3. The air pollution control system according to claim 2, further comprising
- an ammonia supply unit for feeding ammonia to the flue gas discharged to the flue gas duct disposed downstream of the boiler.

* * * * *